United States Patent
Hafeneger et al.

(10) Patent No.: US 8,467,663 B2
(45) Date of Patent: Jun. 18, 2013

(54) VIDEO CONTEXT POPUPS

(75) Inventors: Stefan Hafeneger, Elsdorf (DE); Gary Flint, San Jose, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 13/030,716

(22) Filed: Feb. 18, 2011

(65) Prior Publication Data

US 2012/0213495 A1 Aug. 23, 2012

(51) Int. Cl.
*H04N 5/93* (2006.01)
*G06F 3/00* (2006.01)
*G06F 3/16* (2006.01)

(52) U.S. Cl.
USPC .................. 386/282; 715/716; 715/727

(58) Field of Classification Search
USPC .............. 386/282, E5.028; 715/716, 727
See application file for complete search history.

(56) References Cited

U.S. PATENT DOCUMENTS

| | | | |
|---|---|---|---|
| 5,966,121 A | 10/1999 | Hubbell et al. | |
| 2010/0107126 A1 | 4/2010 | Lin et al. | |
| 2010/0281375 A1 | 11/2010 | Pendergast et al. | |
| 2010/0281376 A1 | 11/2010 | Meaney et al. | |
| 2010/0281386 A1 | 11/2010 | Lyons et al. | |
| 2011/0107215 A1* | 5/2011 | Klappert | 715/716 |

FOREIGN PATENT DOCUMENTS

| | | |
|---|---|---|
| BE | 1017966 | 2/2010 |
| WO | WO 01/99403 | 12/2001 |
| WO | WO-0199403 A2 | 12/2001 |

OTHER PUBLICATIONS

Chua, Tat-Seng, et al., "A Video Retrieval and Sequencing System," ACM Transaction of Information Systems, 13(4), Oct. 11995, 373-407.
Girgensohn, Andreas, et al., "A Semi-automatic Approach to Home Video Editing," UIST '00. San Diego, CA USA ; CH1 Letters, vol. 2, 2; 2000 ACM 1-58113-212-3/00/11, 9 pages.
International Search Report and Written Opinion for PCT/US2012/025668 filed Feb. 17, 2012, dated Jun. 5, 2012, 10 pages.
"International Application Serial No. PCT/US2012/025668, Search Report mailed Jun. 5, 2012", 3 pgs.
"International Application Serial No. PCT/US2012/025668, Written Opinion mailed Jun. 5, 2012", 5 pgs.
"International Application Serial No. PCT/US2012/025668 Written Opinion mailed Mar. 18, 2013", 5 pgs.

* cited by examiner

*Primary Examiner* — Thai Tran
*Assistant Examiner* — Syed Hasan
(74) *Attorney, Agent, or Firm* — Schwegman Lundberg & Woessner, P.A.

(57) ABSTRACT

Video context popups are disclosed. In some implementations, video popups can be displayed in a video editor to provide context to a user who is editing a video clip sequence. In some implementations, a user can indicate a position in a video clip sequence where one or more video clips may be added to the video clip sequence and one or more video popups can be presented that display a portion of one or more video clips that are adjacent to the indicated position. Implementations include a method, system and computer-readable medium for performing video context popups.

21 Claims, 11 Drawing Sheets

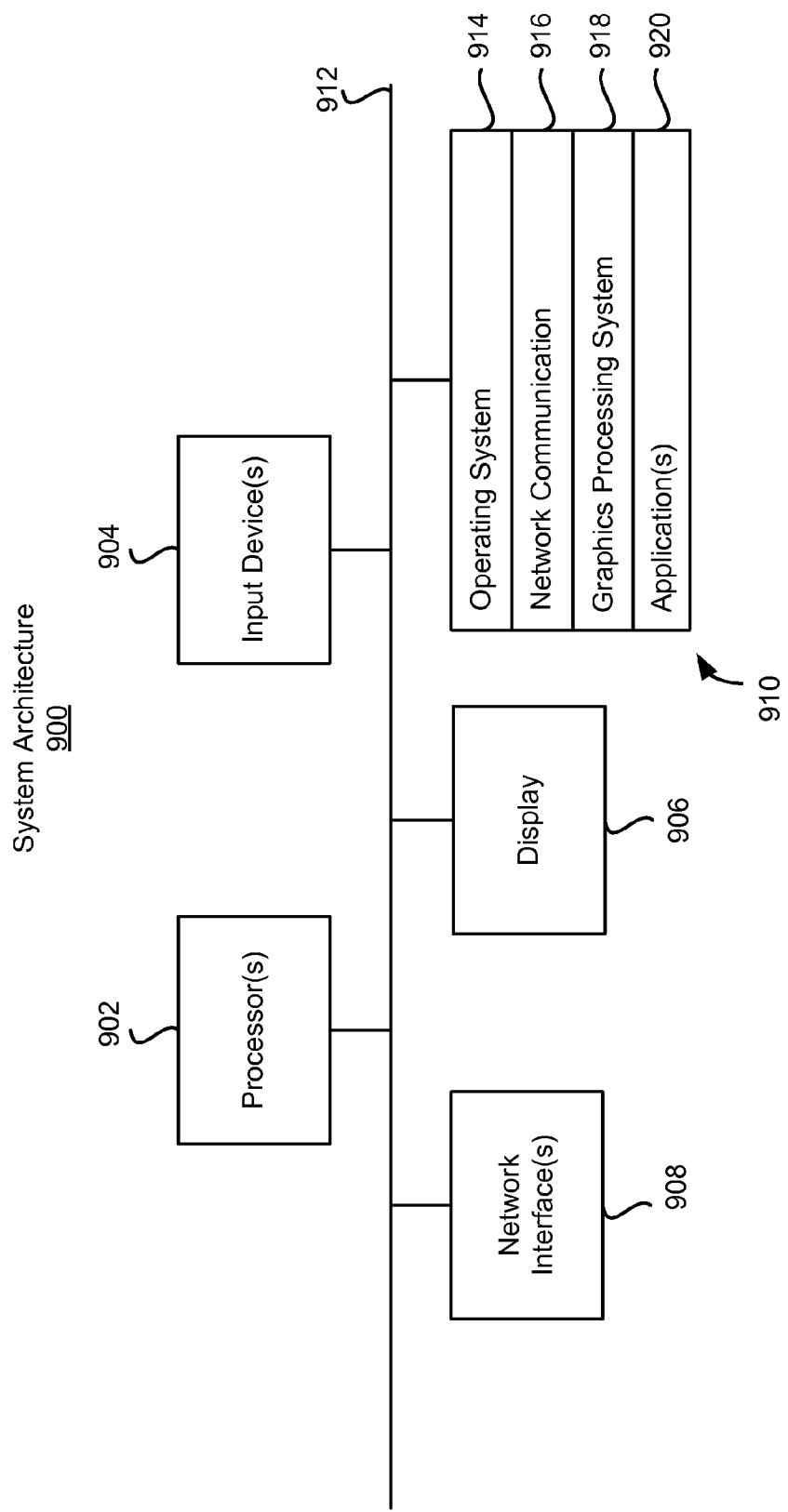

VIDEO CONTEXT POPUPS

TECHNICAL FIELD

The disclosure generally relates to graphical user interfaces and digital video editing.

BACKGROUND

Video editing applications allow users to create, manipulate and aggregate video data. Vendors of video editing applications often seek to provide a user interface that makes video editing applications easy to use. Often vendors attempt to provide an interface with a look and feel that a user may enjoy.

SUMMARY

Video context popups are disclosed. In some implementations, video popups can be displayed in a video editor to provide context to a user who is editing a video clip sequence. In some implementations, a user can indicate a position in a video clip sequence where one or more video clips may be added and one or more video popups can be presented that display a portion of one or more video clips that are adjacent to the indicated position. Implementations include a method, system and computer-readable medium for performing video context popups.

Particular implementations provide at least the following advantages: 1) video context popups can make a video editor easier to use by providing context for the user's video editing activities; and 2) video context popups can save time while editing video clip sequences by automatically presenting portions of video clips, e.g., without requiring the user to select and play the video clips.

Details of one or more implementations are set forth in the accompanying drawings and the description below. Other features, aspects, and potential advantages will be apparent from the description and drawings, and from the claims.

DESCRIPTION OF DRAWINGS

FIG. 9 is a block diagram of an example system architecture implementing the features and processes of FIGS. 1-7.

DETAILED DESCRIPTION

Figure 1:
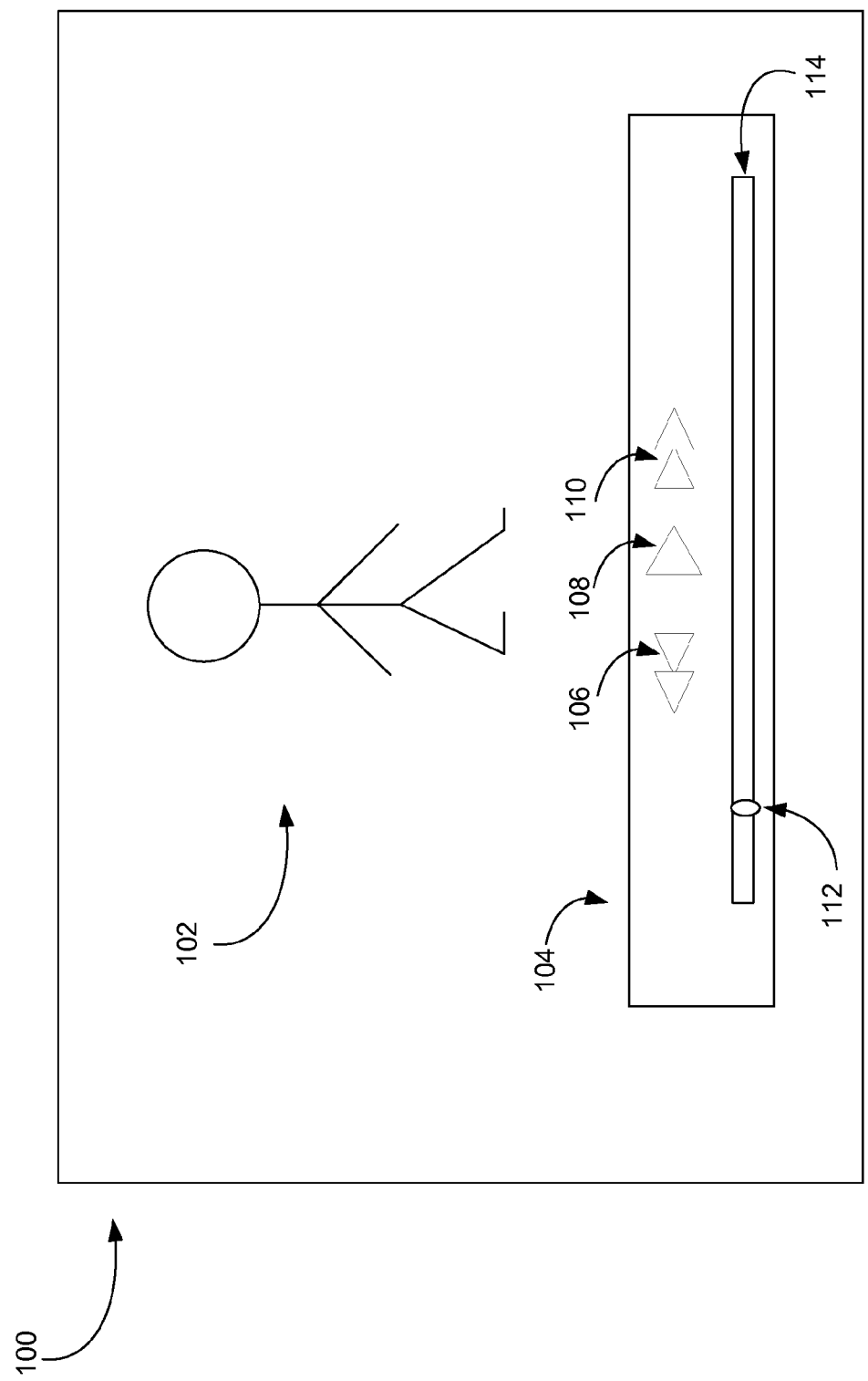
FIG. 1 illustrates an example video playback user interface.

FIG. 1 illustrates an example video playback user interface of a video editing application. The video playback user interface includes display environment 100. For example, display environment 100 may be an application window displayed on a display of a computing device. The display environment may be configured to display an image 102. For example, the image 102 may be a video image having successive frames of video clips or a still image such as a digital photograph. Control element 104 includes user interface elements 106, 108 and 110 for controlling the display of video. For example, element 106 allows a user to rewind (move the video back in time) a video, element 108 allows a user to play a video, and element 110 allows a user to fast forward a video. Control element 104 may also include timeline 114 to indicate to a user the duration of a video, how much of the video has been played, or how much of the video remains to be played. Timeline 114 may include position indicator 112 to indicate to a user the current position in the timeline during playback of a video. The video playback interface may also provide a user interface element (not shown) for entering an edit mode of the video editing application. For example, a user may enter an edit mode of the video editing application by selecting a menu item from a typical pull-down menu or by selecting a user interface element displayed in display environment 100 or displayed on control element 104.

Figure 2:
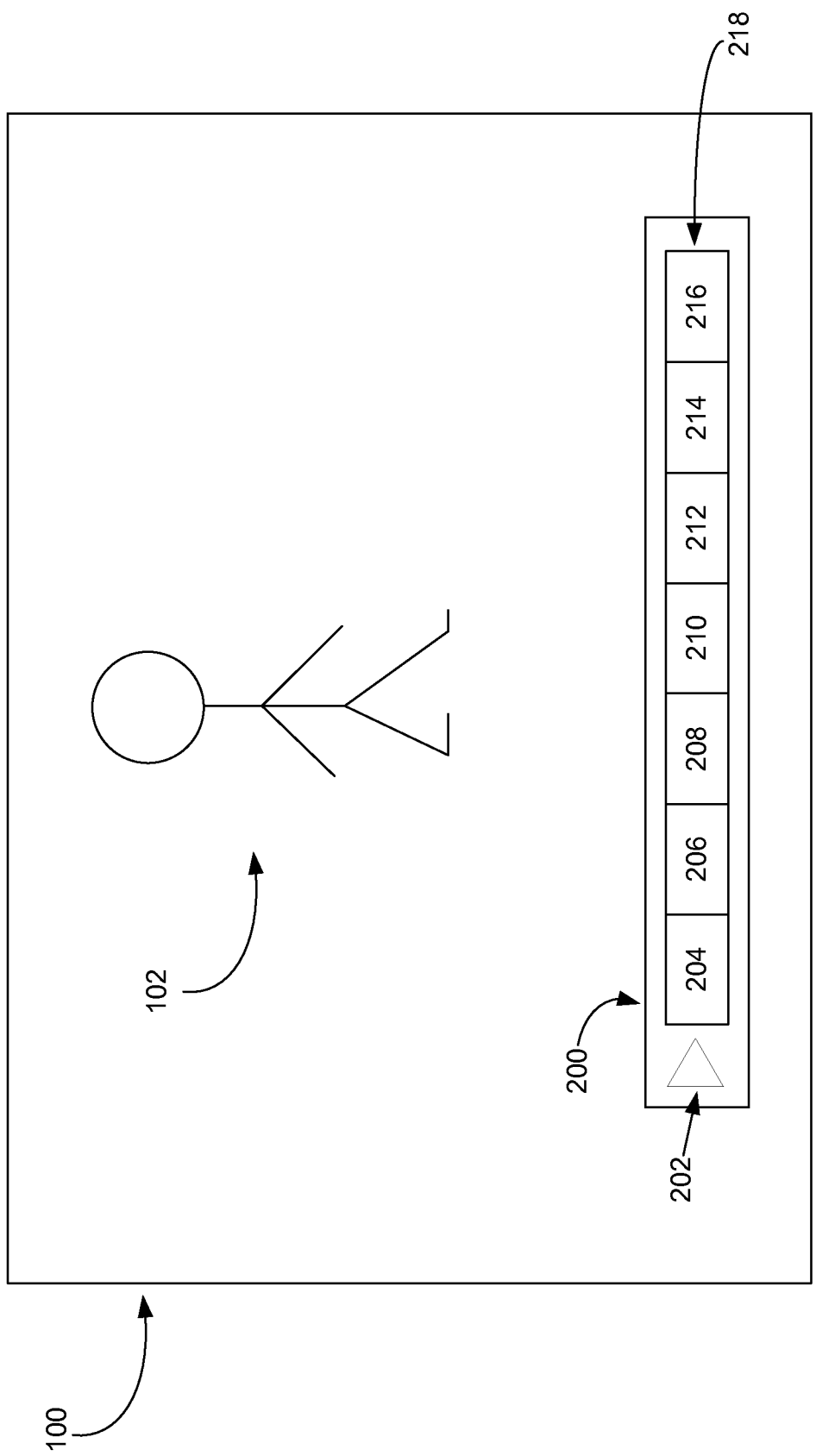
FIG. 2 illustrates an example video editing user interface.

FIG. 2 illustrates an example video editing user interface of a video editing application. The display environment 100 may include control element 200. For example, control element 200 may be displayed when the video editing application is in an edit mode. Control element 200 may be a semi-transparent overlay control element that allows a user to see the displayed image 102 through the control element 200. Control element 200 may include user interface element 202 that allows a user to play a video and a timeline 218 that displays images representing portions of a video 204-216 (video clips). Thus, the video includes the sequence of video clips 204-216 in timeline 218. Implementations disclosed herein allow a user to reorder the sequence of video clips 204-216 within timeline 218 by allowing the user to manipulate images that represent each video clip in the display environment 100.

According to implementations, the video editing application may be configured so that video clips may be added to timeline 218 by performing a drag and drop operation on a video clip. For example, a video clip outside of display environment 100 (e.g., external to the video editing application) may be selected by a user, dragged to a location in timeline 218, and dropped at the location into the sequence of video clips 204-216. If no video clips exist in the timeline, the external video clip is added to timeline 218. Video clips already in timeline 218 may be rearranged or removed through drag and drop operations. For example, a user may select a clip in timeline 218 and drag it to a different location in timeline 218 to modify the sequence of video clips 204-216. To remove video clips from timeline 218, the user may select one or more video clips and delete the selected video clips via a menu item (such as a delete menu item in a pull-down menu) or a keyboard key (such as a delete or backspace key).

Figure 3:
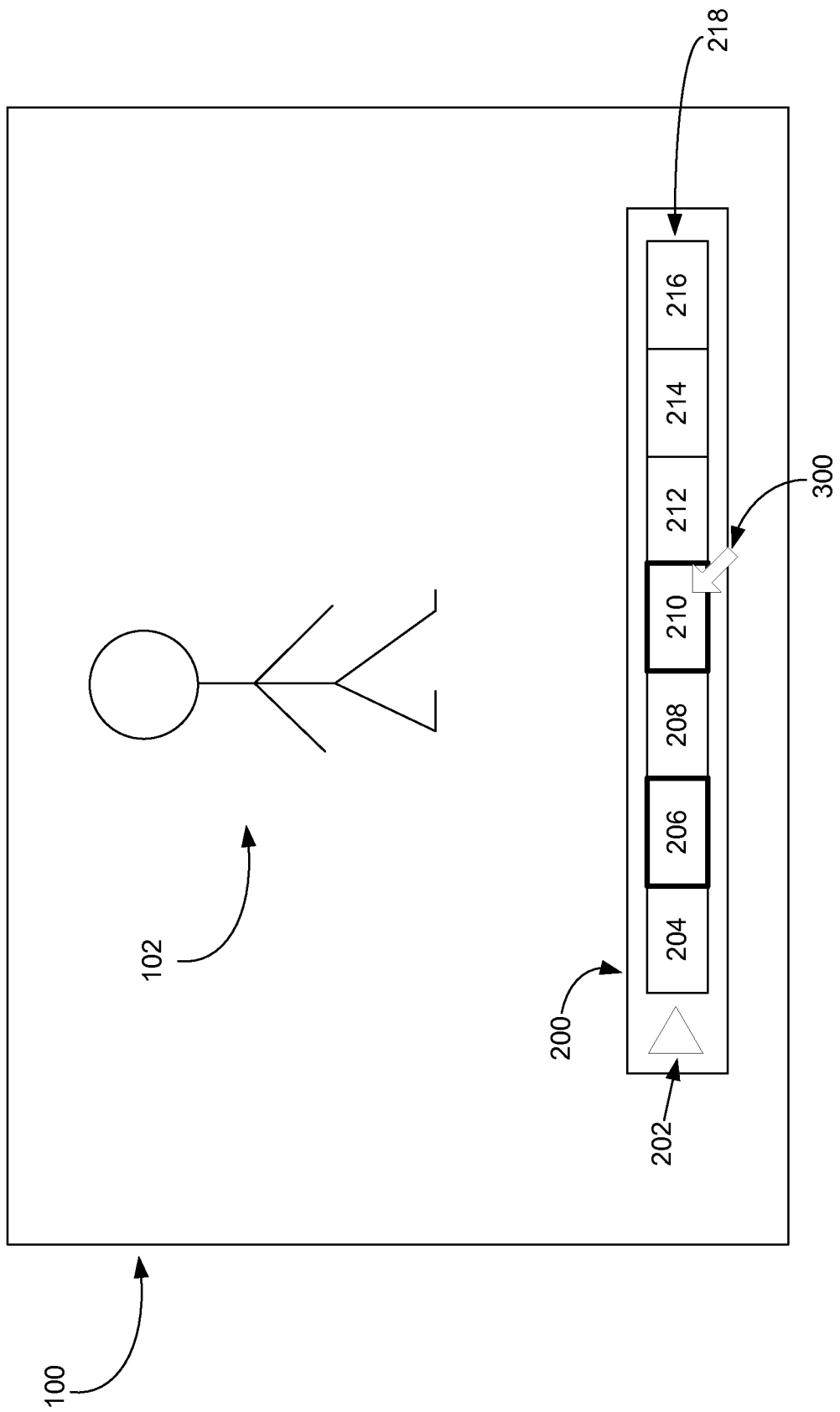
FIG. 3 illustrates an example of selecting multiple video clips from a timeline.

FIG. 3 illustrates selecting multiple video clips from a timeline in a video editing application. Multiple video clips may be selected from timeline 218. For example, highlighted video clips 206 and 210 may be selected so that operations may be performed on both clip 206 and clip 210 at the same time. Multiple clips may be selected by a user using cursor 300. For example, a user may position cursor 300 over clip 206 and provide a cursor input (e.g., click of a mouse, touch of a touch pad or touch screen, etc.) indicating that the user would like to select clip 206. The appearance of clip 206 can be changed to indicate its selection status. The user may then position cursor 300 over clip 210 and provide input indicating that the user would like to select clip 210 in addition to selecting clip 206. For example, to indicate a multiple selection of clip 206 and clip 210 a user may press and hold a key (e.g., command key, shift key, control key, etc.) on a keyboard in addition to providing the cursor input. Once clip 206 and clip 210 have been selected, a user may perform video editing operations on the multiple selected video clips.

Figure 4:
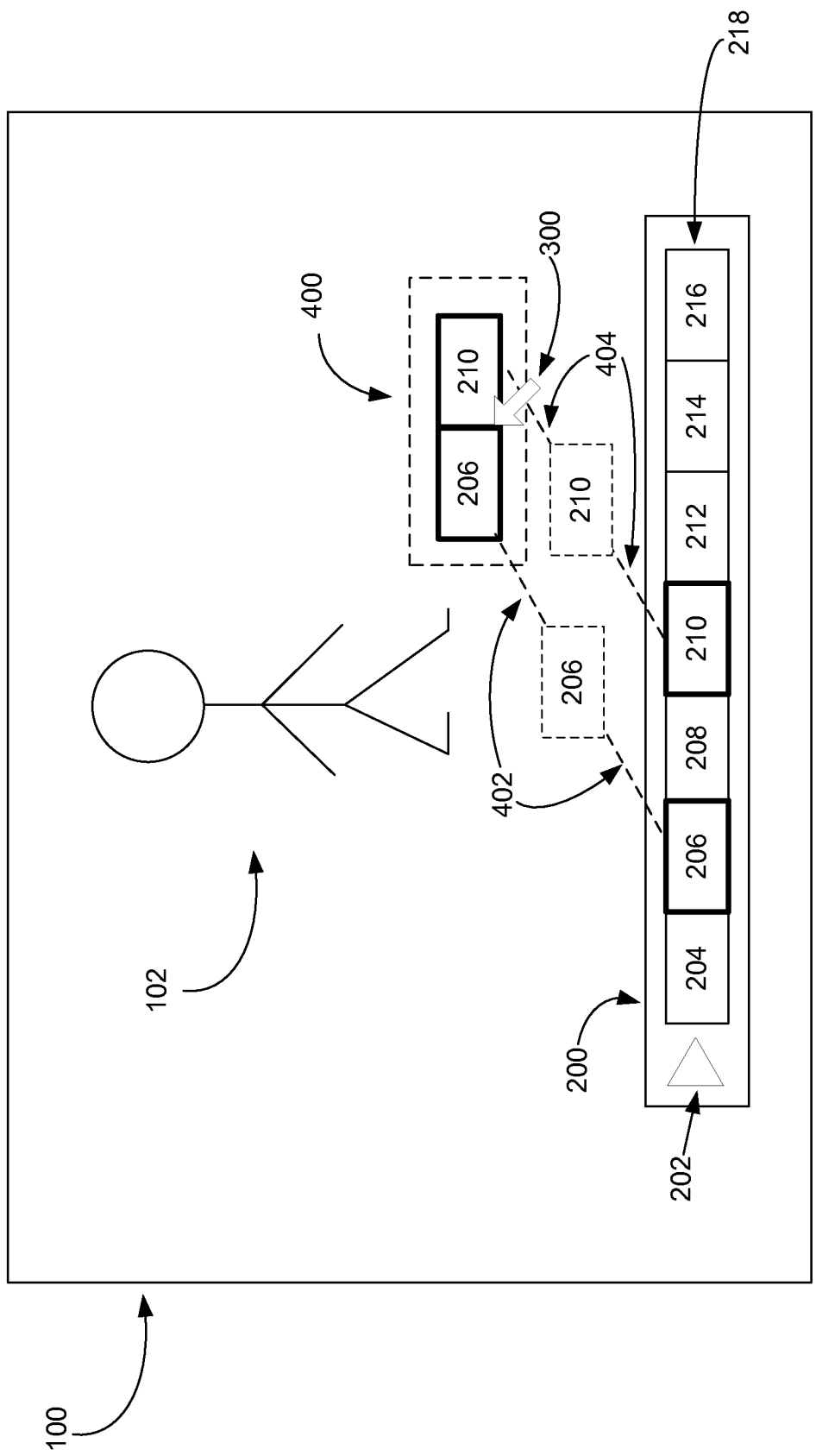
FIG. 4 illustrates an example of video clip flocking.

FIG. 4 illustrates video clip flocking. Flocking, or gathering of user interface elements, may be employed to improve the user experience in a video editing application. For example, a sequence of clips, 204-216, may be in a video being edited. A user may select non-adjacent clips 206 and 210, and then drag the selected clips out of their current locations in timeline 218. According to implementations, when dragged with the cursor, the clips may "flock" together (move closer to one another) as they move to cursor 300. For example, clips 206 and 210 may move to cursor 300 along respective paths 402 and 404 (or the same path) and be displayed at the location of cursor 300 as video clip preview 400. Thus, a user may observe images representing clips 206 and 210 moving across a display from their respective locations in timeline 218 to a location of cursor 300 on the display.

A video clip preview may be presented to a user to provide a contextual preview of the selected video clips. For example, clip 206 and clip 210 may be displayed in preview 400 as a contiguous sequence of video clips. Clip 206 and clip 210 may be positioned in preview 400 in the same relative order in which they were positioned in timeline 218. The video clip preview 400 may be moved about display environment 100 using cursor 300. For example, a user may move cursor 300 around display environment 100 and the video clip preview 400 may move proximate to cursor 300 such that cursor 300 and the video clip preview 400 appear to move together.

Figure 5A:
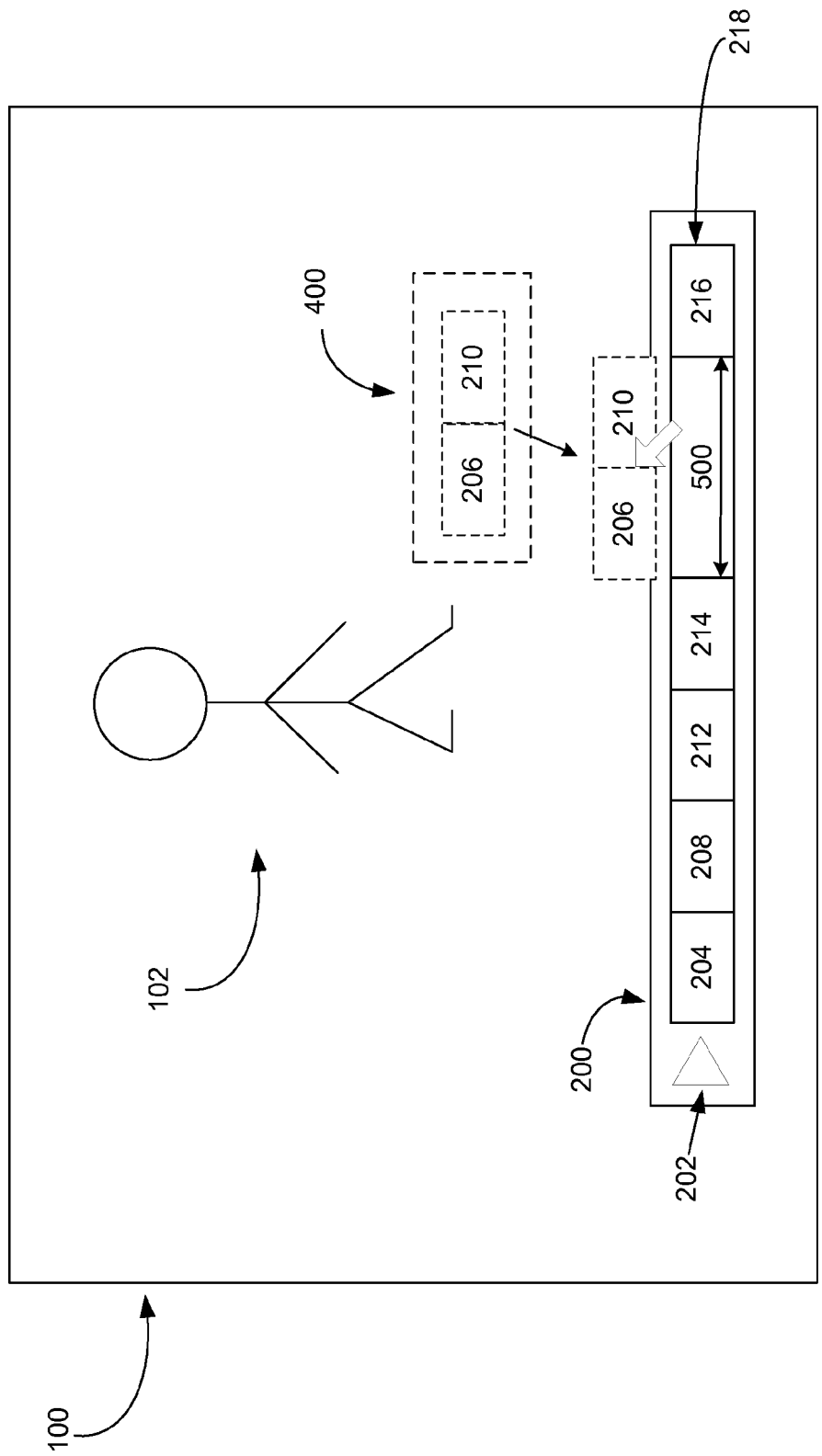
FIG. 5A illustrates an example of expanding a space in the timeline to accommodate selected video clips.

FIG. 5A illustrates expanding a space in a timeline to accommodate selected video clips. According to an implementation, a contextual preview of selected video clips is provided that allows selected clips to be treated as a single clip. For example, if the user drags clip 206 and clip 210 between clip 214 and clip 216 and hovers the mouse over the position between clip 214 and clip 216, a space 500 between clip 214 and clip 216 in timeline 218 will grow to a width that corresponds to the total duration of clip 206 and clip 210 thereby giving the user a sense of how long the two clips are relative to clip 214 and clip 216. Growing the space may be done by a gradual widening of the space between two clips in the timeline. In other words, growing the space may be performed by gradually moving two adjacent clips in the timeline apart to create a distance between the two clips that corresponds to the total duration of the video clips in the preview sequence.

Figure 5B:
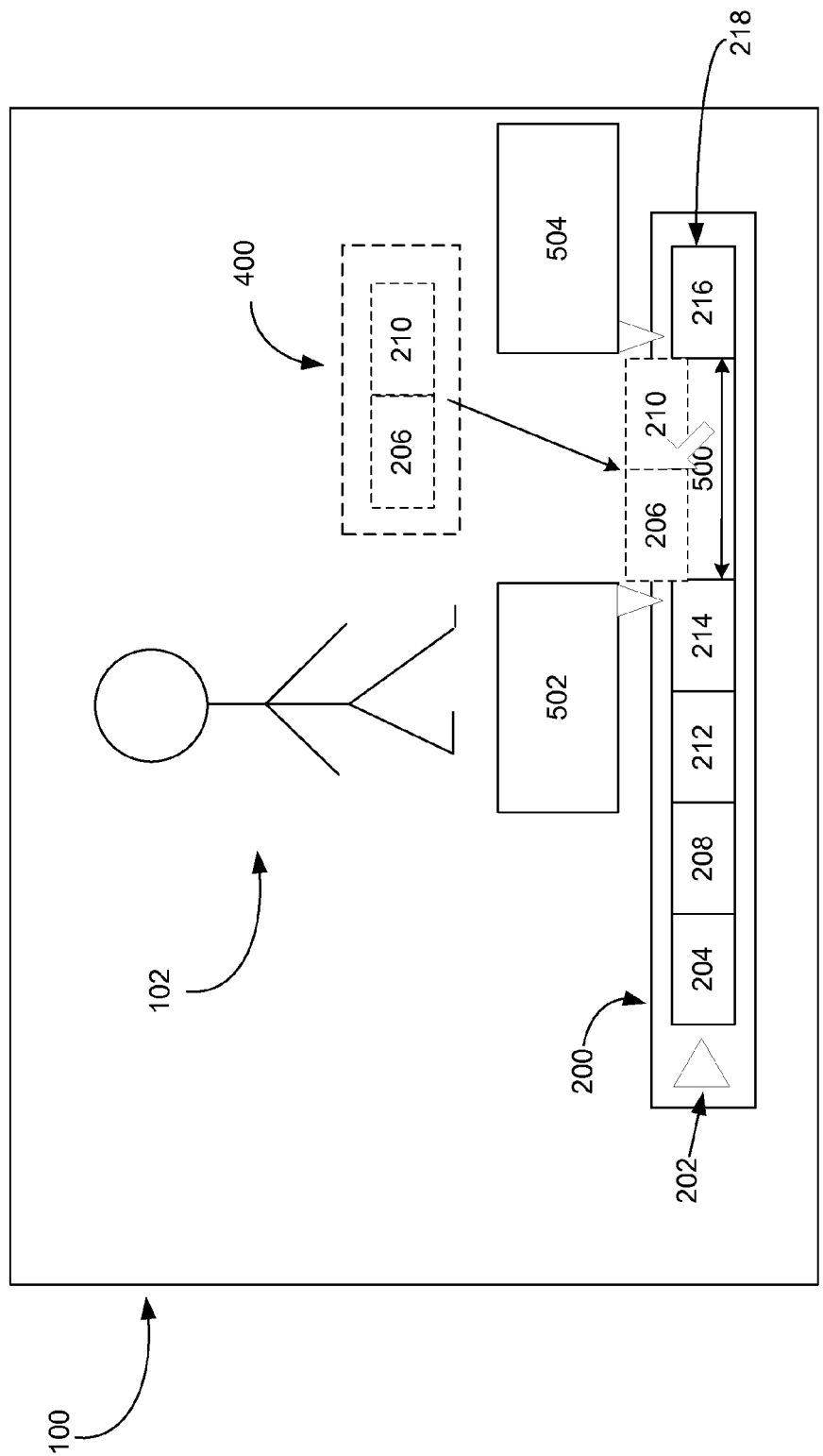
FIG. 5B illustrates an example of video context popups.

FIG. 5B illustrates an example of video context popups. According to some implementations, video context popups can be displayed to provide a user additional context for a position in the timeline where a video clip, or video clips, may be inserted. For example, if the user drags clip 206 and clip 210 between clip 214 and clip 216 and hovers the mouse or cursor over the position between clip 214 and clip 216, video context popups 502 and 504 may be displayed. In some implementations, video context popups can provide an enlarged view of portions of video clips adjacent to the position in the timeline. For example, a video context popup may be a window, display area or other user interface element that can present or play portions of video clips in a larger format than the thumbnail images displayed for each video clip in timeline 218. Moreover, rather than the still images that may represent each video clip in timeline 218, the video context popups can display video (e.g., moving pictures) of portions of video clips in timeline 218.

In some implementations, video context popups can be displayed after the video clips 206 and 210 are hovered over the position in the timeline for a period of time. For example, video context popups may be displayed after the user hovers the mouse, cursor and/or video clips 206 and 210 over the position in the timeline for a period of time (e.g., two seconds). Delaying the presentation of video context popups may reduce the amount of interference and aggravation that the video context popups may cause to a user who already knows where she wants to insert a video clip and does not desire or require the contextual information that the video context popups provide.

In some implementations, video context popups 502 and 504 can display portions of video clips 214 and 216, respectively. For example, video context popup 502 may display the last five seconds of video clip 214. Video context popup 504 may display the first five seconds of video clip 216, for example. In some implementations, if the user hovers the mouse and/or video clips 206 and 210 over a position with only one adjacent video clip (e.g., a position at the beginning or ending of the video clip sequence in timeline 218) only one video context popup may be displayed.

In some implementations, the portions of the video clips displayed in the video context popups can be looped. For example, the last 5 seconds (or 7 seconds, 10 seconds, etc.) of video clip 214 may be played repeatedly and continuously until the user inserts video clips 206 and 210 into the timeline at the position or until the user moves the video clips to another position in the timeline or cancels the video clip insertion or move operation.

In some implementations, the portions of the video clips displayed in the video context popups can be displayed, or played, simultaneously. For example, video context popups 502 and 504 may play back portions of respective video clips 214 and 216 simultaneously. The simultaneously displayed portions of the respective video clips 214 and 216 may be looped.

In some implementations, a user may indicate a position within a single video clip into which the user wishes to insert one or more video clips. For example, the user may hover video clips 206 and 210 over a position in the middle of video clip 212 in timeline 218 and cause video clip 212 to split thereby generating two video clips based on video clip 212. In some implementations, video context popups can be presented that display, or play back, portions of video clip 212 adjacent to the indicated position. For example, if video clip 212 is 30 seconds long and a user indicates a position at 20 seconds, a first video context popup may be presented that displays a portion of video clip 212 corresponding to a video clip segment that begins at 15 seconds and ends at 20 seconds of video clip 212. A second video context popup may be presented that displays a portion of video clip 212 corresponding to a video clip segment that begins at 20 second and ends at 25 seconds of video clip 212, for example.

In some implementations, the portions of the video clips displayed in the video context popups can be displayed, or played, in sequence. In some implementations, the portions of split video clip 212 displayed by the first and second video context popup may be displayed in sequence. For example, the first video context popup may play its portion of video clip 212 first and the second video context popup may play its portion of video clip 212 after the first video context popup has played its portion of video clip 212. In some implementations, the sequential display of portions of a video clip can be looped in a continuous and alternating fashion. For example, the first video context popup may play its portion of video clip 212 first, the second video context popup may play its portion of video clip 212 second and the first video context popup may play its portion of video clip 212 again followed by the second video context popup.

In some implementations, audio associated with the video clip portions played in the video context popups can be prevented from playing while presenting video context popups. For example, if two video context popups are displayed and the respective portions of the video clips displayed in the video context popups are played simultaneously, then audio for the video clip portions may not be played.

In some implementations, audio associated with the video clip portions presented in video context popups can be played. For example, if a single video context popup is presented and a single video clip portion is played, the audio associated with the single video clip portion may be played. As another example, if two video context popups are presented and the video clip portions associated with the video context popups are played in sequence or simultaneously, then audio may be played for each video context popup.

In some implementations, the audio for a video clip portion is played on a respective audio channel associated with a video context popup. For example, if the first video context popup is displayed on the left and the second video context popup is displayed on the right, the audio for the first video context popup may be presented on a left audio channel and the audio for the second video context popup may be presented on a right audio channel. For example, all of the audio channels of the video clip portion displayed in the left video context popup may be mixed to the left audio channel and all of the channels of the video clip portion displayed in the right video context popup may be mixed to the right audio channel. Thus, a user can differentiate the audio for the first video context popup and the right video context popup based on the respective audio channels even though the audio for the two video clip portions is being played simultaneously. In some implemetations, the audio may pan between right and left audio channels in order to allow the user to associate the audio with the right or left clip, respectively.

In some implementations, the video displayed in a video context popup can include a portion of a video clip adjacent to the position in the timeline and a portion of the video clip that may be inserted into the position in the timeline. For example, when video clips 206 and 210 are hovered between video clip 214 and 216, video context popups 502 and 504 may be displayed. Video context popup 502 may display the last five seconds of video clip 214 and the first five seconds of video clip 206 thereby providing a preview of how the video clips may look when played in sequence. Similarly, video context popup 504 may display the last five seconds of video clip 210 and the first five seconds of video clip 216 so that the transition between video clip 210 and video clip 216 may be previewed by the user.

In some implementations, the video displayed in a video context popup can include a preview of a transition selected for transitioning between a video clip (e.g., video clip 214) adjacent to the position in the timeline and a video clip (e.g., video clip 206) that may be inserted into the position in the timeline. For example, a transition may be selected either by the user or automatically for transitioning between video clip 214 and video clip 206. The selected transition may be a hard-cut, a fade, crossfade, dissolve or other transition, for example. When video clips 206 and 210 are hovered between video clip 214 and 216, video context popups 502 and 504 may be displayed. Video context popup 502 may display the last five seconds of video clip 214, a selected transition, and the first five seconds of video clip 206 thereby providing a preview of how the video clips and the transition may look when played in sequence. Similarly, video context popup 504 may display the last five seconds of video clip 210, a selected transition, and the first five seconds of video clip 216 so that the transition between video clip 210 and video clip 216 may be previewed by the user.

Figure 5C:
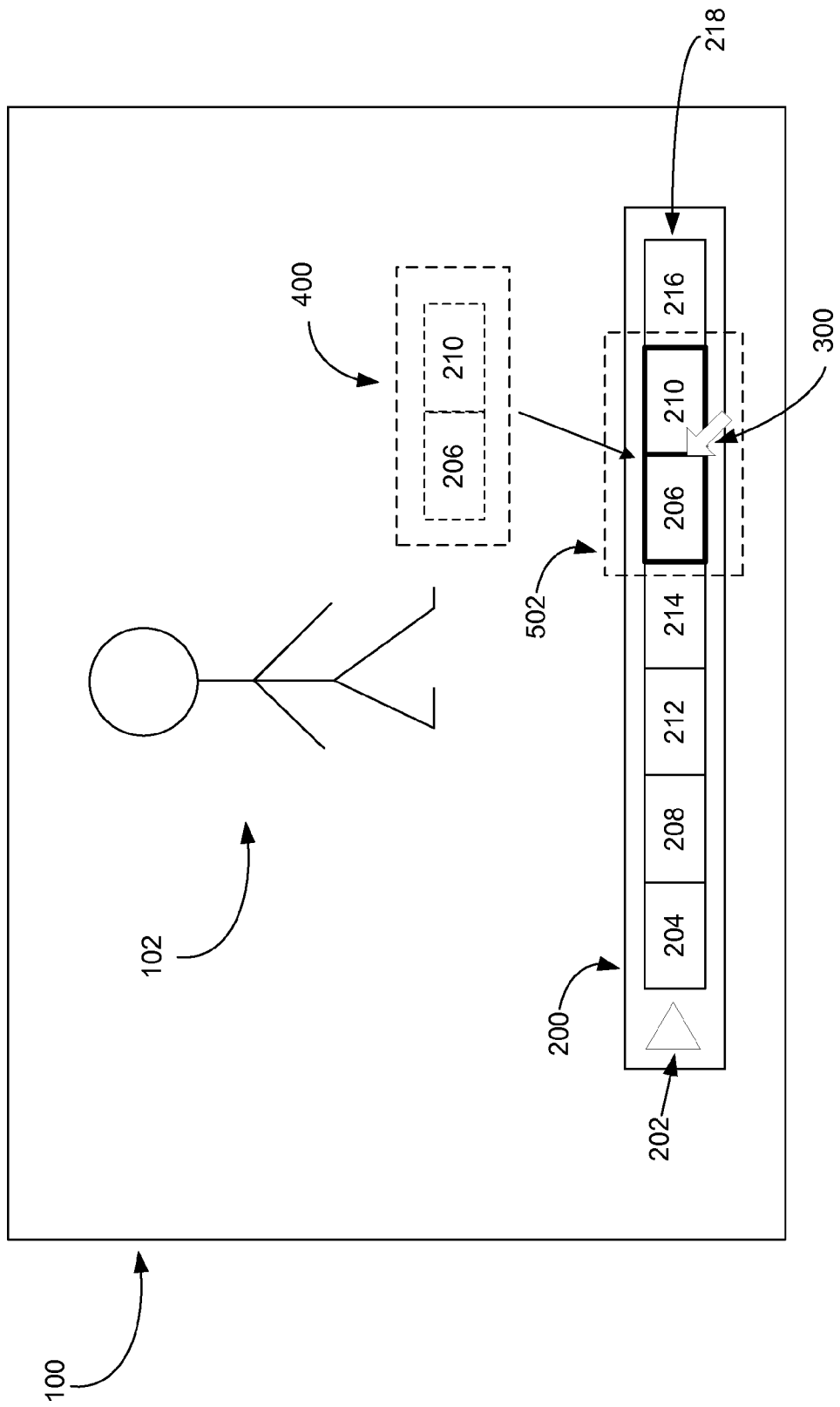
FIG. 5C illustrates an example of inserting selected video clips into a new position in the timeline.

FIG. 5C illustrates inserting selected video clips into a new position in the timeline 218. For example, preview sequence 400 that includes clips 206 and 210 may be dragged into timeline 218 using cursor 300 and dropped between clip 214 and clip 216. When dropped, clips 206 and 210 may be moved from their previous positions in timeline 218 to a new position between clip 214 and clip 216 in timeline 218. Thus, a user may use cursor 300 to cause a drag-and-drop operation to be performed by the video editing application that changes the order of the video clips 204-216 in the video clip sequence displayed in timeline 218.

Figure 6:
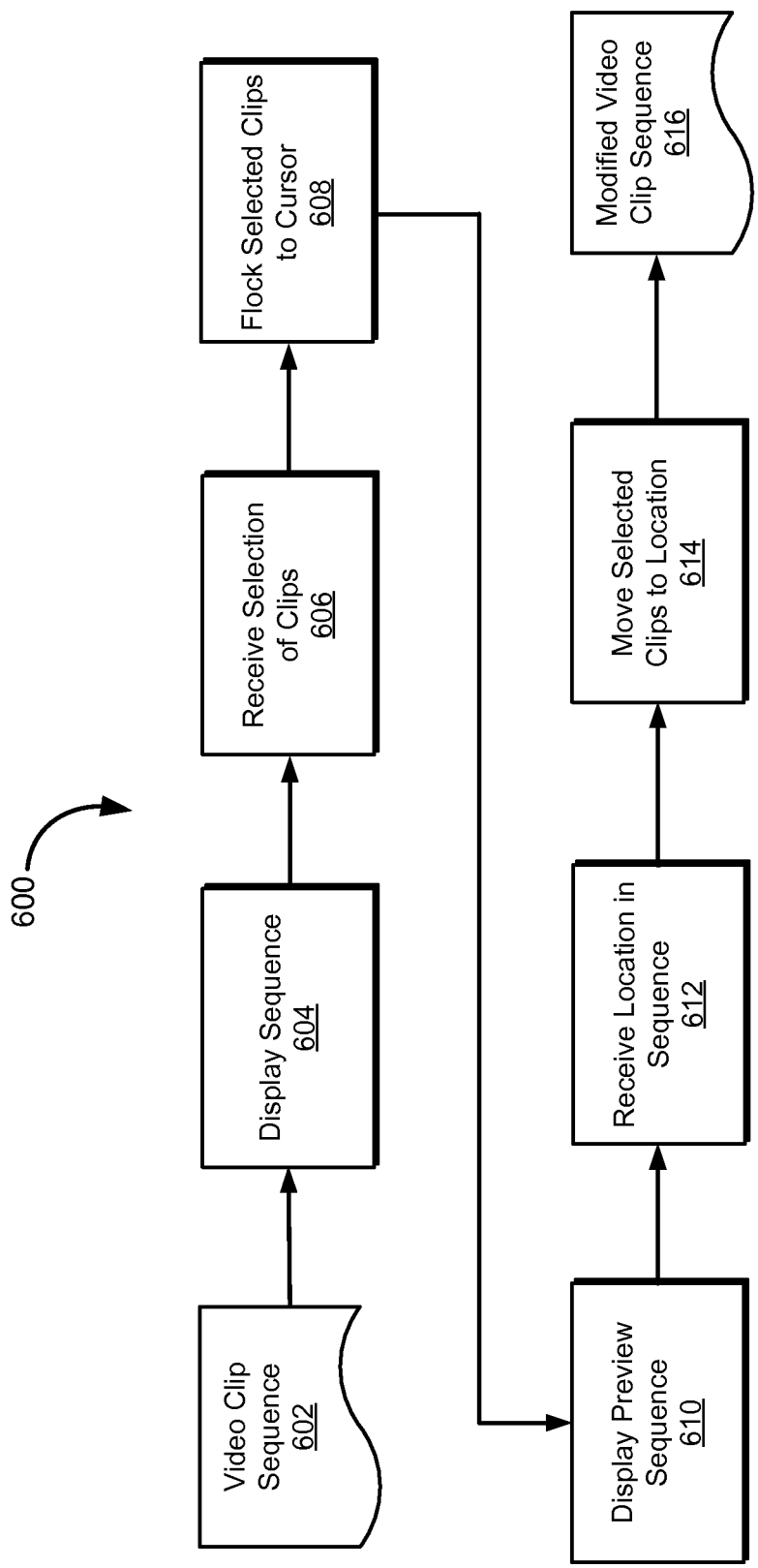
FIG. 6 is a block diagram of an example video clip flocking system.

FIG. 6 is a block diagram of an example video clip flocking system. The video clip flocking system allows a user to manipulate images corresponding to one or more video clips in order to modify a sequence of video clips being edited in the system. The system is configured to perform operations on video clip sequence 602. For example, video clip sequence 602 may include video clips from a single video or may include video clips from several different videos that a user wishes to combine into a single video using the example system.

In block 604, the video clip sequence is displayed. For example, the video clip sequence may be displayed on a timeline, such as timeline 218 of FIG. 2, on a user interface of a video editing application. The timeline may indicate a present order of the video clips in the sequence. The timeline may also indicate the duration of each video clip and/or the duration of the sequence of video clips.

In block 606, a selection of video clips is received. For example, a user may select one or more video clips displayed in the timeline. The clips may be adjacent or non-adjacent clips. For example, multiple non-adjacent clips may be selected.

In block 608, the selected clips are flocked to the cursor. Flocking may be initiated by dragging one of the selected clips from the timeline. For example, in FIG. 4, if clips 206 and 210 are selected and clip 210 is dragged from the timeline, clips 206 and 210 may flock to the location of the cursor. Once the clips are dragged from the timeline, the timeline may display empty spaces at the locations in the timeline from which the clips were dragged. Alternatively, the timeline may continue to display the images of the selected clips after the clips are dragged from the timeline. If non-adjacent clips are selected, each clip may take a different respective path from their respective locations in the timeline to the cursor location. For example, images representing each clip may be displayed in the timeline. Multiple non-adjacent clips may be selected and dragged to a location on the display using the cursor. When dragged, the images of the selected clips may move along respective paths to the location of the cursor, as illustrated by FIG. 4. If adjacent clips are selected from the timeline, the adjacent clips may be treated as a single clip as they move from the timeline to the cursor location.

In block 610, a preview sequence of the selected clips is displayed. For example, once the selected clips have flocked to the cursor location, a preview sequence of the selected clips may be displayed. The preview sequence may display images corresponding to the selected clips in the same respective order as they were displayed in the timeline. The preview sequence may be moved around the display as if the sequence was a single clip. For example, a user may use the cursor to move the preview sequence around the display. Allowing the preview sequence to be manipulated in this way may allow drag-and-drop operations to be performed on the video clips in the preview sequence.

The preview sequence of video clips may be held at the cursor until released. For example, a user may select multiple clips from the timeline and click and hold a mouse button down to drag the clips from the timeline. While the user continues to hold the mouse button down, a preview sequence may continue to be displayed at the location of the cursor. If the user releases the mouse button at a location other than the timeline or if the user cancels the preview by pressing a keyboard key (e.g., Esc or Backspace keys), the preview sequence may be released causing the images of the video clips in the preview sequence to return to the timeline without changing the timeline. For example, when a cancel event is received (e.g., the preview is canceled or released) a reverse flocking animation may be performed in which the video clip images in the preview sequence may be shown or animated to move back to their original positions in the timeline from the video clip preview. When the preview sequence is released, the images may be displayed moving back to the timeline from the cursor location along respective paths. Once the images have reached the timeline, the video clip images may occupy empty spaces in the timeline that were created when the video clip images were dragged from the timeline.

In block 612, a location in the sequence of clips in the timeline is received. For example, a user may move the preview sequence of video clips as if the sequence was a single clip to a location in the timeline. The user may hover the preview sequence over the location. For example, a user may hold a mouse button down while dragging the preview sequence to the location in the timeline and hover the preview sequence over the location by continuing to hold the mouse button down while the preview sequence is held over the location. While hovering the preview sequence over the location in the timeline, the video clips in the timeline near the location may move to grow a space in the timeline having a width that corresponds to the total duration of the video clips in the preview sequence, as illustrated by FIG. 5A.

In block 614, the selected clips are moved to the location in the timeline. For example, the preview sequence (sequence of images of selected clips) may be dragged to a location in the timeline and dropped (mouse button released) into the timeline at the location. When the preview sequence is dropped into the location in the timeline, the images of the selected clips may be inserted at the drop location in the timeline. Dropping the preview sequence into the timeline at the location may cause the sequence of video clips in the timeline to be modified. The modified sequence of video clips in the timeline may be generated by moving the selected video clips from their previous locations in the timeline to a new location in the timeline corresponding to the location in the timeline where the preview sequence was dropped. Thus, the system may generate and display a modified sequence of images in the timeline and generate a modified sequence of video clips 616 that corresponds to the modified sequence of images.

Figure 7:
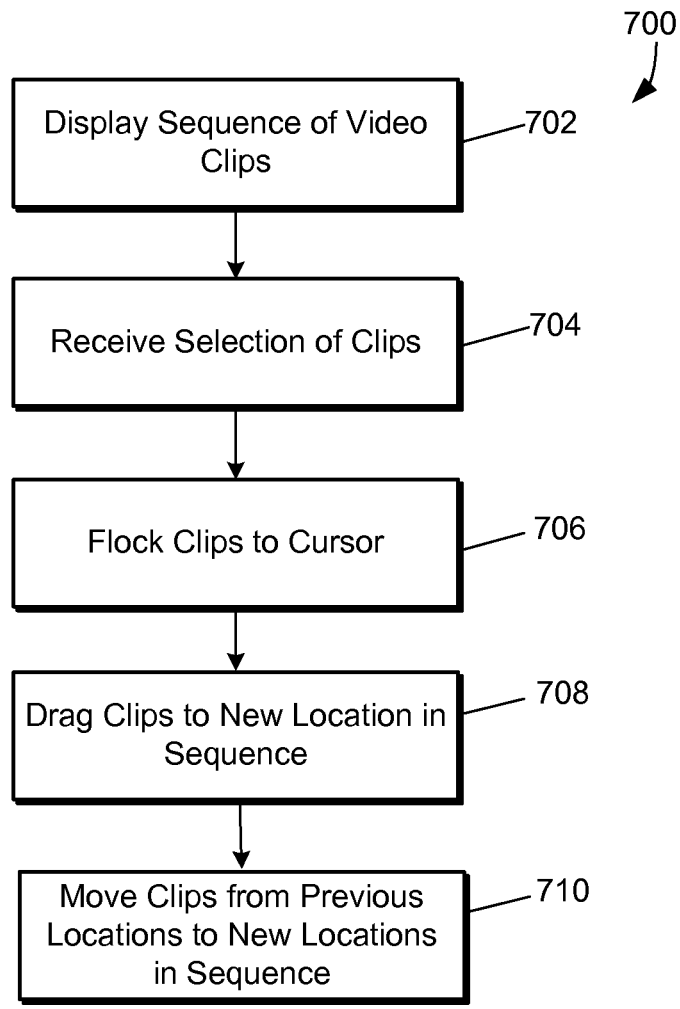
FIG. 7 is a flow diagram of an example video clip flocking process.

FIG. 7 is a flow diagram of an example video clip flocking process. At step 702, a sequence of video clips is displayed. For example, the sequence of video clips may be displayed in the manner disclosed in the descriptions of FIG. 2 and FIG. 6, above.

At step 704, a selection of video clips is received. For example, a selection of video clips may be received in the manner disclosed in the description of FIG. 3 and FIG. 6, above.

At step 706, the selected video clips are flocked to a cursor. For example, the selected video clips may be flocked to the cursor in the manner disclosed in the description of FIG. 4 and FIG. 6, above.

At step 708, the selected video clips are dragged to a new location in the sequence. For example, the selected video clips may be dragged to a new location in the sequence in the manner disclosed in the description of FIG. 5A, FIG. 5C and FIG. 6, above.

At step 710, the selected video clips are moved from their previous locations in the sequence to new locations in the sequence. For example, the selected video clips may be moved in the sequence in the manner disclosed in the description of FIG. 5A, FIG. 5C and block 614 of FIG. 6, above.

Figure 8:
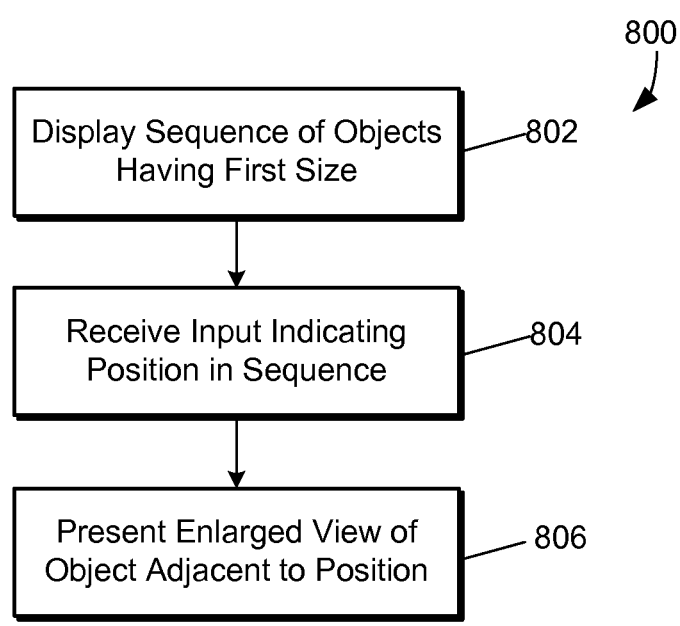
FIG. 8 is a flow diagram of an example video context popups process.

FIG. 8 is a flow diagram of an example video context popups process. At step 802, a sequence of objects having a first size is displayed. For example, a sequence of video clips (e.g., video clips 204-216 of FIG. 2) may be displayed on an interface (e.g., interface 100) of a video clip editing application running on a computing device. The video clip sequence may include thumbnail images representing each video clip in the video clip sequence. In some implementations, the sequence of objects can be a sequence of photographs or still images. In some implementations, the objects in the sequence of objects may have a particular display size.

At step 804, input is received that indicates a position in the sequence of objects. For example, a user may indicate a position within the sequence of video clips where a video clip may be inserted or moved. For example, a user may wish to add a video clip to the video clip sequence and indicate a position in the sequence where the user is considering placing the video clip. A user may wish to move a video clip from a position in the video clip sequence to another position in the video clip sequence and indicate a position in the sequence where the user is considering moving the video clip. In some implementations, a user may indicate the position by hovering a cursor, mouse pointer, or a video clip over a position in the displayed video clip sequence.

At step 806, an enlarged view of one or more objects adjacent to the indicated position is presented. For example, once the user has indicated a position in the video clip sequence, video clips adjacent to the position in the timeline may be determined. In some implementations, there can be one adjacent video clip. For example, if the indicated position is at the beginning or end of the video clip sequence, then there may be only one video clip adjacent to the indicated position. In some implementations, there can be two adjacent video clips. For example, if the indicated position is in the middle of the video clip sequence, or in the middle of a video clip, there may be two video clips adjacent to the indicated position. In some implementations, the user may indicate a position in the middle of a single video clip and the video clip may be split to generate two video clips so that another video clip can be placed in between the two generated video clips. For example, portions of the two generated video clips may be displayed in respective video context popups.

According to some implementations, a video context popup can be displayed for each adjacent video clip to present an enlarged view of each adjacent video clip. For example, the video clips in the video clip sequence may be represented by one or more still images. The one or more still images may have a small size that is difficult for the user to see and that makes the video context surrounding a particular position in the video clip sequence difficult to ascertain. The video context surrounding the particular position may be difficult to ascertain because the still images used to represent video clips may not provide enough contextual information to identify the adjacent video clips (e.g., a user may need to view several video frames or short duration of video to properly ascertain the video context).

In some implementations, portions of adjacent video clips can be displayed having a larger size than the video clip images displayed in the video clip sequence. For example, a window or display area having bigger dimensions than that of the video clip images displayed in the video clip sequence may be displayed, or popped up, on the user interface of a video editing application. In some implementations, the portions of the adjacent video clips can be displayed according to the larger dimensions of the popped up display area. In some implementations, the adjacent video clips are displayed as motion pictures (e.g., a series of frames, video) rather than still images, as disclosed above with reference to FIG. 5B. In some implementations, the video context popups can display portions of adjacent video clips, portions of video clips to be inserted or moved and/or transitions selected for transitioning between the adjacent video clips and the video clips to be inserted or moved.

Example System Architecture

FIG. 9 is a block diagram of an example system architecture implementing the features and processes of FIGS. 1-8. The architecture 900 can be implemented on any electronic device that runs software applications derived from compiled instructions, including without limitation personal computers, servers, smart phones, media players, electronic tablets, game consoles, email devices, etc. In some implementations, the architecture 900 can include one or more processors 902, one or more input devices 904, one or more display devices 906, one or more network interfaces 908 and one or more computer-readable mediums 910. Each of these components can be coupled by bus 912.

Display device 906 can be any known display technology, including but not limited to display devices using Liquid Crystal Display (LCD) or Light Emitting Diode (LED) technology. Processor(s) 902 can use any known processor technology, including but are not limited to graphics processors and multi-core processors. Input device 904 can be any known input device technology, including but not limited to a keyboard (including a virtual keyboard), mouse, track ball, and touch-sensitive pad or display. Bus 912 can be any known internal or external bus technology, including but not limited to ISA, EISA, PCI, PCI Express, NuBus, USB, Serial ATA or FireWire. Computer-readable medium 910 can be any medium that participates in providing instructions to processor(s) 902 for execution, including without limitation, non-volatile storage media (e.g., optical disks, magnetic disks, flash drives, etc.) or volatile media (e.g., SDRAM, ROM, etc.).

Computer-readable medium 910 can include various instructions 914 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 904; sending output to display device 906; keeping track of files and directories on computer-readable medium 910; controlling peripheral devices (e.g., disk drives, printers, etc.) which can be controlled directly or through an I/O controller; and managing traffic on bus 912. Network communications instructions 916 can establish and maintain network connections (e.g., software for implementing communication protocols, such as TCP/IP, HTTP, Ethernet, etc.).

A graphics processing system 918 can include instructions that provide graphics and image processing capabilities. For example, the graphics processing system 918 can implement the video context popups, as described with reference to FIGS. 1-7.

Application(s) 920 can be an image processing application or any other application that uses video context popups described in reference to FIGS. 1-7, such as a photo or video editor. Video context popups can also be implemented in operating system 914.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. An editing method comprising:
   generating data for displaying a sequence of objects in an interface of a computing device, each of the objects in the sequence having a first display size;
   receiving a selection input of an insertion object;
   receiving an insertion input indicating a position adjacent to at least one object in the sequence of objects;
   generating a context popup for automatically presenting an enlarged view of at least a portion of the at least one object, in response to the insertion input; and
   displaying the view in the context popup adjacent to the at least one object in the sequence of objects, the enlarged view having a second display size that is larger than the first display size.

2. The method of claim 1, wherein the sequence of objects is a sequence of video clips.

3. The method of claim 1, further comprising:
   generating transition data for presenting a transition of the insertion object to the position indicated by the insertion input.

4. The method of claim 1, further comprising:
   generating a second context popup for presenting a second view of at least a portion of a second object.

5. The method of claim 1, further comprising:
   receiving a second selection of a second insertion object; and
   flocking the insertion object and the second insertion object to a cursor location.

6. The method of claim 5, further comprising:
   presenting a contextual preview including: the portion of the insertion object, the second insertion object, and the portion of the at least one object.

7. The method of claim 5, wherein displaying the sequence of objects includes, in response to the insertion input, expanding a space in the sequence of objects to accommodate the insertion object and the second insertion object.

8. A non-transitory computer-readable medium including one or more sequences of instructions which, when executed by one or more processors, causes:
   generating data for displaying a sequence of objects in an interface of a computing device, each of the objects in the sequence having a first display size;
   receiving a selection input of an insertion object;
   receiving an insertion input indicating a position adjacent to at least one object in the sequence of objects;
   generating a context popup for automatically presenting an enlarged view of at least a portion of the at least one object, in response to the insertion input; and
   displaying the view in the context popup adjacent to the at least one object in the sequence of objects, the enlarged view having a second display size that is larger than the first display size.

9. The non-transitory computer-readable medium of claim 8, wherein the sequence of objects is a sequence of video clips.

10. The non-transitory computer-readable medium of claim 8, wherein for:
    generating transition data for presenting a transition between the insertion object, and the view of at least the portion of the at least one object in the sequence of objects.

11. The non-transitory computer-readable medium of claim 8, wherein the instructions comprise instructions for:
    receiving input indicating a position adjacent to a second object in the sequence of objects; and
    generating data for presenting a second view of at least a portion of the second adjacent object.

12. The non-transitory computer-readable medium of claim 8, the instructions comprise instructions for:
    receiving a second selection of a second insertion object; and
    flocking the insertion object and the second insertion object to a cursor location.

13. The non-transitory computer-readable medium of claim 12, the instructions comprise instructions for:
    presenting a contextual preview including: the portion of the insertion object, the second insertion object, and the portion of the at least one object.

14. The non-transitory computer-readable medium of claim 12, wherein displaying the sequence of objects includes, in response to the insertion input, expanding a space in the sequence of objects to accommodate the insertion object and the second insertion object.

15. A system comprising:
    at least one processor; and
    a computer-readable storage medium storing instructions which, when executed by the at least one processor, causes:
    generating data for displaying a sequence of objects in an interface of a computing device, each of the objects in the sequence having a first display size;
    receiving a selection input of an insertion object;
    receiving an insertion input indicating a position adjacent to at least one object in the sequence of objects;
    generating a context popup for automatically presenting an enlarged view of at least a portion of the at least one object, in response to the insertion input; and
    displaying the view in the context popup adjacent to the at least one object in the sequence of objects, the enlarged view having a second display size that is larger than the first display size.

16. The system of claim 15, wherein the sequence of objects is a sequence of video clips.

17. The system of claim 15, wherein the instructions comprise instructions for:
generating transition data for presenting a transition between the insertion object, and the view of at least the portion of the at least one object in the sequence of objects.

18. The system of claim 15, wherein the instructions comprise instructions for:
generating a second context popup for presenting a second view of at least a portion of a second object.

19. The system of claim 15, wherein the instructions comprise instructions for:
receiving a second selection of a second insertion object; and
flocking the insertion object and the second insertion object to a cursor location.

20. The system of claim 19, wherein the instructions comprise instructions for:
presenting a contextual preview including: the portion of the insertion object, the second insertion object, and the portion of the at least one object.

21. The system of claim 19, wherein displaying the sequence of objects includes, in response to the insertion input, expanding a space in the sequence of objects to accommodate the insertion object and the second insertion object.

* * * * *

UNITED STATES PATENT AND TRADEMARK OFFICE
CERTIFICATE OF CORRECTION

PATENT NO. : 8,467,663 B2
APPLICATION NO. : 13/030716
DATED : June 18, 2013
INVENTOR(S) : Stefan Hafeneger It is certified that error appears in the above-identified patent and that said Letters Patent is hereby corrected as shown below:

In the Claims:

In column 12, line 23, in claim 10, after "wherein", insert --the instructions comprise instructions--, therefor.

Signed and Sealed this
Twenty-seventh Day of August, 2013

Teresa Stanek Rea
*Acting Director of the United States Patent and Trademark Office*